May 2, 1933. F. F. PARIS 1,907,332
ASPARAGUS ROOT GRUBBER
Filed Sept. 3, 1932 4 Sheets-Sheet 1
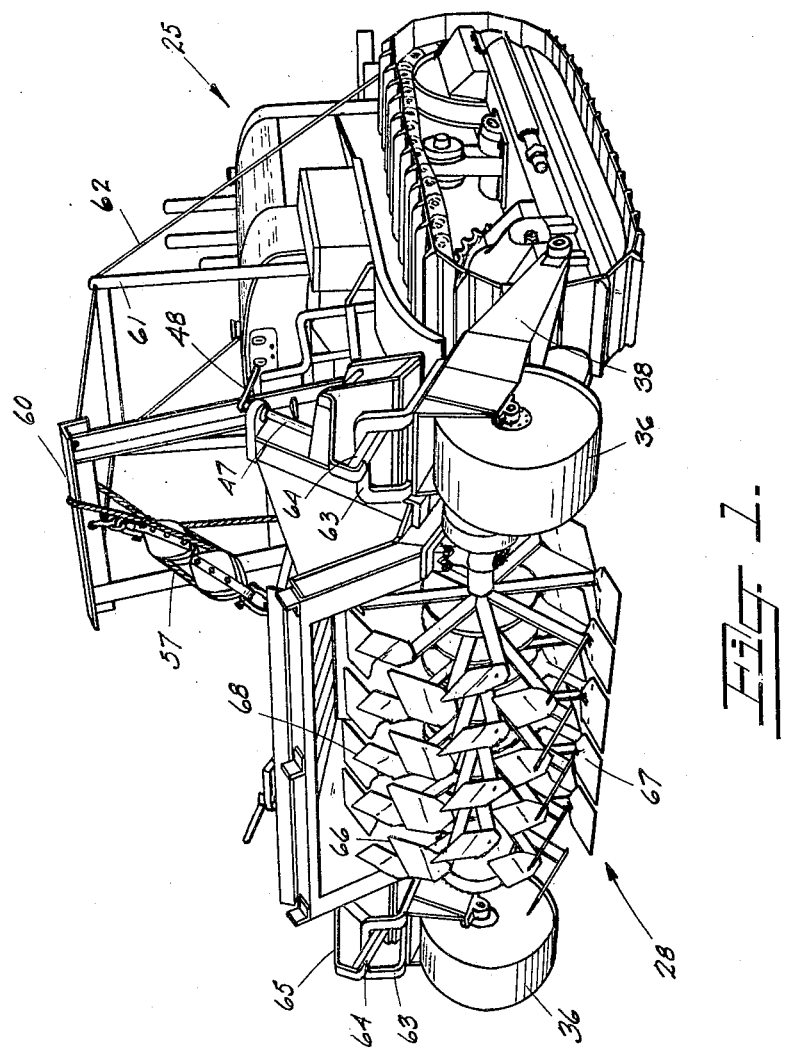

May 2, 1933. F. F. PARIS 1,907,332
ASPARAGUS ROOT GRUBBER
Filed Sept. 3, 1932 4 Sheets-Sheet 2
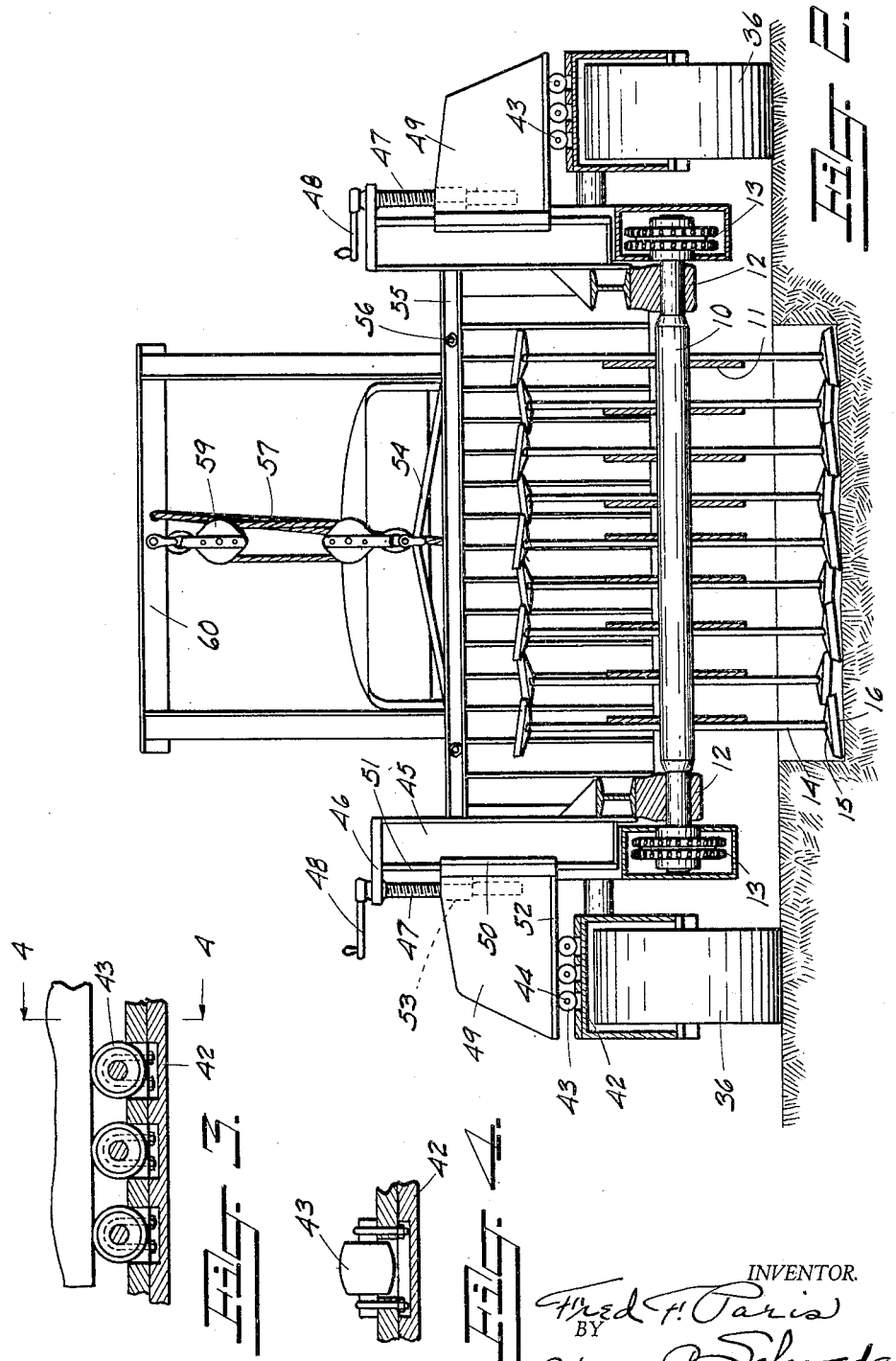
INVENTOR.
Fred F. Paris
BY
Harry C. Schroeder
ATTORNEYS.

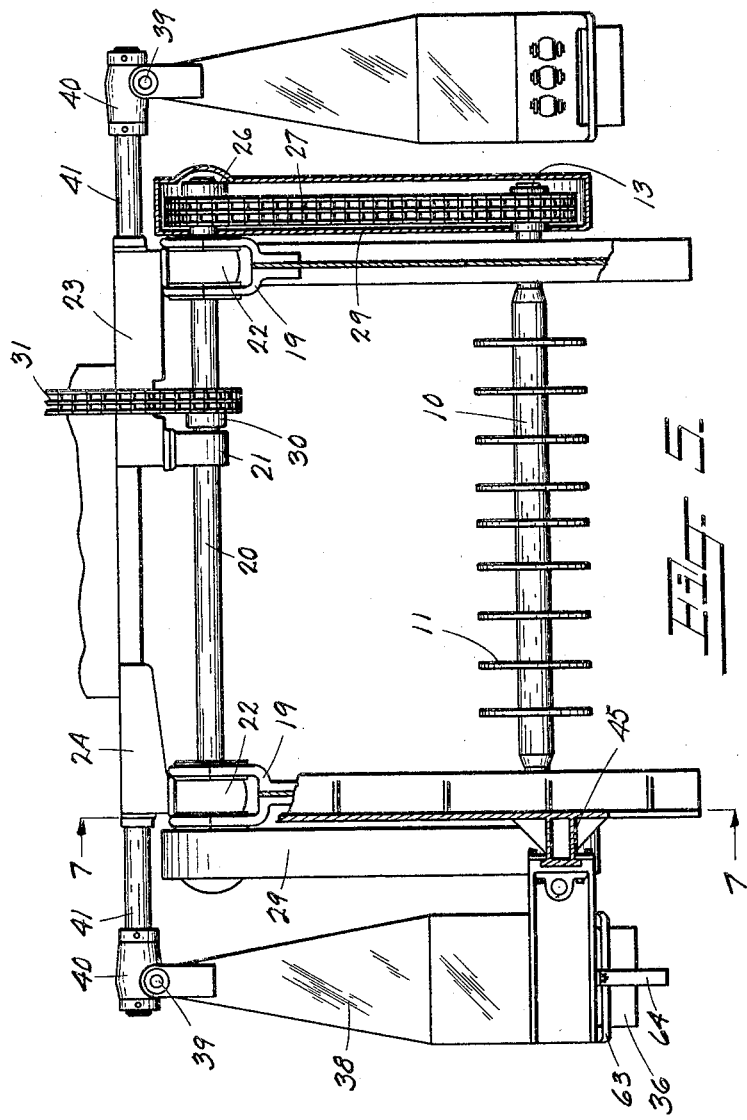

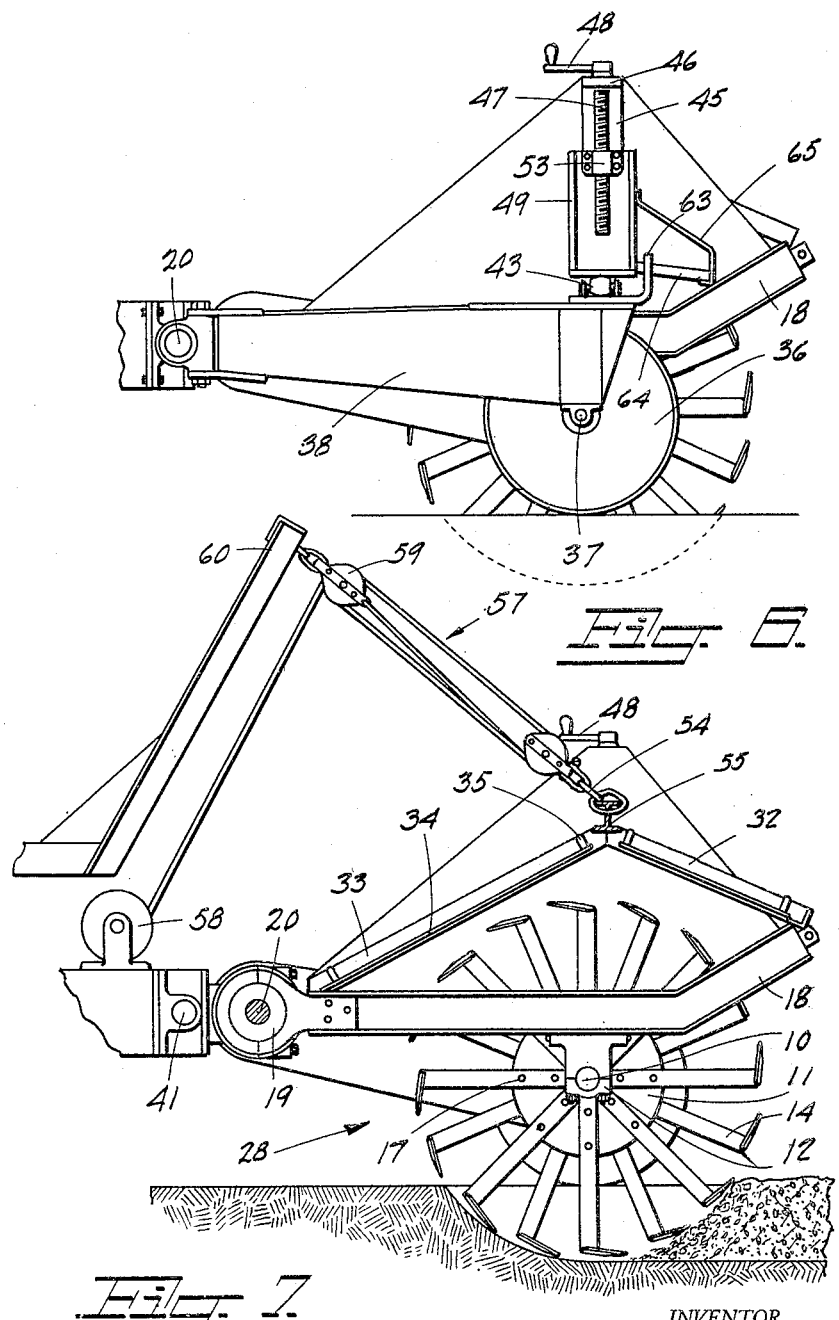

Patented May 2, 1933

1,907,332

UNITED STATES PATENT OFFICE

FRED F. PARIS, OF BERKELEY, CALIFORNIA

ASPARAGUS ROOT GRUBBER

Application filed September 3, 1932. Serial No. 631,605.

This invention is an asparagus root grubber which is especially adapted for the purpose of grubbing asparagus roots although the device may be used for other grubbing purposes and for loosening up and pulverizing soil, and is intended to be used in conjunction with a tractor or similar tractive device having a power unit.

Asparagus roots, as is well known, are very difficult to break up and special means must be provided for this purpose, and unless this means is properly designed and operated, very inefficient results will be obtained.

The main object of the invention is to provide a device which will efficiently grub asparagus roots and which coincidentaly will pulverize the soil so as to place the soil in ideal condition for replanting.

Another object of the invention is to provide a device as outlined with means for regulating the depth of the cut and in which the cutting member is permitted to float relative to the supporting members.

A further object of the invention is to provide a device as outlined which may be coupled directly to a tractor and which may be driven thereby, means being provided for moving the device out of cooperative relation to the soil.

A still further object of the invention is to provide a hood over the cutting element which is self-cleaning and adapted to prevent accumulation of soil within the hood.

Other objects and advantages of the invention will become apparent as the following description is read on the drawings forming a part of this specification and in which similar reference characters are used to designate similar parts throughout the several views, of which:

Fig. 1 is a perspective view of the invention as mounted on a caterpillar tractor.

Fig. 2 is a rear elevation of the invention, shown partly in section to more clearly indicate the supporting and driving elements.

Fig. 3 is a fragmentary sectional view of the floating means.

Fig. 4 is a section taken on line 4—4 of Fig. 3.

Fig. 5 is a plan view showing the hood and the top of the sprocket case cut away and the blades removed from the rotary cutting element.

Fig. 6 is a side elevation of the invention.

Fig. 7 is a section taken on line 7—7 of Fig. 5.

The rotary digging member consists of a shaft 10 on which is fixedly mounted a plurality of discs 11, which discs are so disposed as to equally space the digging elements when oppositely disposed or mounted on the discs on opposite sides of the center of the shaft, the two central discs being differently spaced than the remaining discs. The shaft 10 is rotatably mounted in bearings 12 and has secured on its opposite ends, sprockets 13 for driving the rotary digging element.

Detachably mounted on the discs 11 are a plurality of equi-angularly spaced cutting arms 14 which terminate in shoes 15, on which are detachably secured the cutting knives 16, the arms being angularly staggered on one disc relative to the arms on the next adjacent disc. These cutting elements are the subject of a separate application for patent filed May 24, 1932, Serial No. 613,189 and are not a part of this invention except in the combination as shown. The discs 11 are provided with suitable apertures for receiving the bolts 17 by means of which the arms 14 are secured to the discs. In addition to the arms being angularly staggered, they are also oppositely disposed, the knives on adjacent discs being oppositely inclined as is clearly indicated in Fig. 2.

The bearings 12 are suitably mounted on the frame 18, the frame being pivotally connected as is indicated at 19 for vertically pivotal movement, to permit raising the cutting elements out of contact with the soil, this pivotal connection being made on a shaft 20 which is parallel to the shaft 10 and spaced therefrom, and which is suitably supported in bearings 21 and 22, which bearings are secured to suitable brackets 23 and 24 and which are fixedly connected to a cross member on the tractor 25. The frame connection 19 is in the form of a yoke straddling the bearings 22 as is clearly indicated in Fig. 5.

Fixed to the outer ends of shaft 20 are sprockets 26 having sprocket chains 27 cooperating therewith and with the sprockets 13 for driving the rotary cutter 28, the sprockets and chains being covered by a suitable guard 29. The shaft 20 is driven by means of a sprocket 30 in cooperation with a chain 31 which is driven by a suitable power take-off or connection with the power unit of the tractor 25 and which may be of any suitable style or arrangement.

Fixedly mounted on the frame 18 and extending over the rotary cutting unit 28 is a shield 32 which consists of a plurality of spaced rectangular bars 33, between which are suspended flatly disposed rectangular bars 34 by means of spanning elements 35, the bars 34 being free to vibrate as also to be reciprocated, whereby any soil adhering to the inside may be broken up either by the vibration of the bars or by raising and lowering the bars by means of the handles 35. This feature is also the subject matter of a separate application for patent filed June 24, 1932, Serial No. 619,014, and is an important feature in the correct operation of this invention as the tendency is often to completely clog the shield requiring the breaking out of the soil before the device can again be operated.

The supporting means for the rotary cutter consists of a single wheel truck mounted on each side of the cutter and which consists of a single broad face wheel 36 which is rotatably mounted in a bearing 37, the bearing 37 being fixedly secured on an arm 38, the arm being pivotally secured as at 39 to a bearing 40, which bearing is rotatable on a shaft 41, the shaft 41 being fixedly secured in the brackets 23 and 24, whereby the road wheel 36 is permitted to freely move either vertically or transversely, swinging about either the pivot 39 or the pivot 41. The arm 38 extends on each side of the wheel 36 and extends across the top as indicated at 42, and has mounted on the top portion 42, a plurality of rollers 43 which are rotatably mounted on shafts 44, these rollers being provided to floatably support the rotary cutter and associated parts.

The adjusting means for adjusting the depth of cut of the rotary cutter is provided by means of a bracket 45 which is fixedly secured to or integral with the frame 18 and extends upwardly therefrom as is clearly indicated in Fig. 2, this bracket having an outwardly extending arm 46 in which is rotatably mounted a screw 47 which is provided at its upper terminal and with a crank handle 48. Slidably mounted on the bracket 45 is a bracket 49, gibs 50 cooperating with the gibway 51 on bracket 45, the bottom 52 of bracket 49 resting on the rollers 43. A nut 53 is fixedly mounted on the bracket 49 and cooperates with the screw 47.

The lifting means for the cutting unit consists of a bar 54 which is secured to the cross member 55 as shown at 56, block and tackle 57 being attached to the bar 54 and cooperating with a driven winch 58, this winch being driven by any suitable means from the tractor. The head block 59 is attached to a gallows 60, which is mounted on the tractor and suitably supported by standards 61 and guy wires or cables 62.

Suitably secured to the rearward end of each arm 38 is a U-shaped member 63 which is provided to cooperate with an arm 64, the U-shaped element 63 permitting lateral movement of the arms 38 as also vertical movement to permit suitable adjustment of the rotary cutter, the arm 64 lifting the wheels 36 off the ground when the rotary cutter is lifted by means of the block and tackle. The outer end of arm 64 is supported by a suitable bracket 65.

The operation of the device is as follows:

The device is coupled on to a tractor 25, which tractor is to be provided with suitable power take-off means for driving the rotary cutter 28 and for operating the winch 58. The rotary cutter 28 and wheels 36 are normally carried out of contact with the ground and it is shown in its raised position in Fig. 1. Suitable clutches are provided for connecting and disconnecting the driving means to the winch 58 and shaft 29. After reaching the point at which the soil is to be loosened or the roots grubbed, the power is delivered through the chain 31 to shaft 20 through the sprocket 30, and thence through sprockets 26 and chain 27 to the sprockets 13, which drives the rotary cutter 28 at high speed.

The cutters are so formed and mounted as to provide a corner cut when entering the soil as is clearly indicated by the cutter shown at 66, and due to the specific projecting angle, transverse angle, and angularity of the cutting edge, provides a level cut when reaching the bottom of the cut as shown by the cutter 67. The rotary cutter is run at a high speed in comparison to the speed of the tractor and on entering the soil the projecting points 68 first enter the soil and due to the obliquity of the cutting edge, a shearing action is provided for the roots.

The rollers 36 ride on the ground on both sides of the rotary cutter and the rotary cutter is supported thereby, the road wheels being free to move laterally on account of the pivotal mounting 39 of the arm 38, while the rotary cutter is secured against lateral movement and due to the fact that the cutter unit is freely resting, or floatably supported on the rollers 43, the wheels 36 are permitted to follow the track of the tractor while the rotary cutter is retained in longitudinal alignment with the tractor.

To adjust the depth of the cut, it is merely necessary to operate the screws 47 by means of the crank handle 48, the U-shaped member 63 permitting all necessary adjustments as related to the arm 64.

Due to the fact that the plow attachment or rotary element is rigidly secured to the tractor agains lateral movement, it is necessary that the plow element be floatably supported to permit the tractor to be steered and to prevent breaking of the plow element. For this reason the supporting elements for the plow attachment or rotary element are pivoted to the tractor to permit lateral movement and the plow attachment freely rests or is floatably supported on the supporting elements so as to permit entire free movement of one of these elements relative to the other, vertically, laterally and longitudinally. The wheels 36 will naturally follow the track of the tractor and deviate from the longitudinal axis thereof, permitting the tractor to be readily steered, and during this following movement the rigidly secured rotary element is retained in line with the lonigtudinal axis of the tractor, floating or freely resting on the supporting members 43.

The yokes 63 permitting considerable free movement in all directions of the arm 64, compensates for the unequal centers of the drive shaft 41 and pivot 20, and also compensates for adjustment of the rotary element as to depth of cut.

It will be understood that variations in construction and arrangement of parts which are consistent with the appended claims may be resorted to without detracting from the spirit or scope of the invention or sacrificing any of the advantages thereof.

I claim:

1. In combination with a tractive device having a power unit, a rotating cutting element attached to said tractive device and driven thereby, means for adjusting said rotating element relative to a surface, supporting means for said cutting element, said supporting means being floatably related to said cutting element.

2. A rotary earth working implement comprising, in combination with a tractor having a power unit; a rotary cutting element and driving means therefor, and supporting means for said rotary cutting element and floatably related thereto.

3. A rotary earth working implement comprising, in combination with a tractor having a power unit; a rotary cutting element and driving means therefor, a supporting frame pivotally connected to said tractor and wheeled supports floatably cooperating with said frame.

4. A rotary earth working implement comprising, in combination with a tractive device having a power unit, a driven rotary cutting element and a supporting frame therefor, said frame being pivotally connected to said tractive device, wheeled supports floatably cooperating with said frame and means for vertically adjusting said cutting element relative to said wheeled supports.

5. A rotary earth working implement, comprising, in combination with a tractive device having a power unit, a driven rotary cutting element and a supporting frame therefor, said frame being pivotally connected to said tractive device, wheeled supports floatably cooperating with said frame, means for vertically adjusting said cutting element relative to said wheeled support, means for raising said cutting element out of contact with a surface and means on said frame for raising said wheeled supports when said cutting element is raised.

6. In combination with a rotary cutting implement, supporting means comprising an arm disposed at each end of said implement, a roller mounted in each arm, said arm being pivotally secured to a tractive device for both, lateral and vertical pivotal movement.

7. A rotary earth working implement comprising a frame provided with means for pivotal attachment to a tractive device and adapted for vertical pivotal movement, a rotary cutting element supported by said frame and adapted to be driven by said tractive device, a wheeled support floatably cooperating with each side of said frame, adjusting means for said frame relative to said supports.

In testimony whereof I affix my signature.

FRED F. PARIS.